Figure 1:
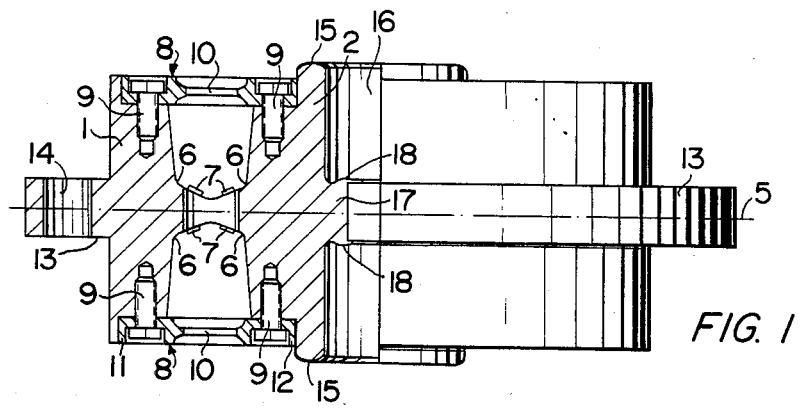

United States Patent [19]

Hellwig

[11] Patent Number: 4,545,262
[45] Date of Patent: Oct. 8, 1985

[54] FORCE MEASURING DEVICE OR LOAD CELL

[75] Inventor: Reimar Hellwig, Ober-Ramstadt, Fed. Rep. of Germany

[73] Assignee: Hottinger Baldwin Measurements, Inc., Framingham, Mass.

[21] Appl. No.: 545,839

[22] Filed: Oct. 27, 1983

[30] Foreign Application Priority Data

Nov. 12, 1982 [DE] Fed. Rep. of Germany ....... 3241850

[51] Int. Cl.⁴ .............................................. G01L 1/22
[52] U.S. Cl. .................................... 73/862.65; 338/5
[58] Field of Search ....................... 73/862.65; 338/5; 177/211

[56] References Cited

U.S. PATENT DOCUMENTS

| | | | |
|---|---|---|---|
| 3,365,689 | 1/1968 | Kutsay | 73/862.67 X |
| 3,706,349 | 12/1972 | Paelian et al. | 73/862.65 |
| 3,712,123 | 1/1973 | Laimins | 73/862.65 |
| 3,871,216 | 3/1975 | Eder | 73/862.65 |
| 3,958,456 | 5/1976 | Jacobson | 73/862.65 |
| 3,960,013 | 6/1976 | Ormond | 73/862.65 |

FOREIGN PATENT DOCUMENTS 0922982 4/1963 United Kingdom ............. 73/862.65

*Primary Examiner*—Charles A. Ruehl
*Attorney, Agent, or Firm*—W. G. Fasse; D. H. Kane, Jr.

[57] ABSTRACT

The deforming body of a force measuring device or load cell is provided with radial stems (3) equipped with foil strain gages (7) and integrally connected to a hollow cylindrical outer ring (1) and to a central hub (2). The outer ring (1) and the central hub (2) extend axially on both sides of a central plane (5) at least as far as three times the largest thickness of the radial stems (3). A force introducing flange (13) is arranged on the outside of the outer ring (1) and lies in the radial central plane (5) of the radial stems (3). Each stem (3) is thicker at its ends near the hub and ring so that the thinnest stem portion is located approximately intermediate the stem ends for providing a linear characteristic for the load cell which is substantially non-sensitive to any loads other than loads applied perpendicularly to the central radial plane.

16 Claims, 2 Drawing Figures

FORCE MEASURING DEVICE OR LOAD CELL

FIELD OF THE INVENTION

The invention relates to a force measuring device such as a load cell with a radially and symmetrically deformable body having radial lands or stems extending in a radial plane and provided with foil strain gages. The radial stems or lands are integrally connected to a central body and to an outer ring, whereby the axial width of the radial lands tapers from each of the two ends.

DESCRIPTION OF THE PRIOR ART

Such force measuring devices which are used as precision load cells in testing machines should have as small a total structural height as possible, a great mechanical strength or rigidity, and especially a great fatigue strength relative to alternating stress. The sensitivity of these load cells to the introduction of eccentric forces should be as small as possible. A known force measuring device of the kind mentioned above is disclosed in U.S. Pat. No. 3,712,123 and is provided with four radial stems separated from each other by bore holes. One face of the radial stems is flat and supports a cover plate which connects the central body with an outer ring, thereby causing a disturbing force shunt. The outer ring extends axially outwardly from the radial stems only in one direction. Thus, bending moments introduced into the outer ring by the radial stems cause a relatively large deformation of the outer ring, which in turn causes reactive effects in the radial stems. This leads to a force measuring device or load cell with a non-linear characteristic which is additionally intensified because the foil strain gages are attached only on the one, profiled face of the radial stems. Further, the known force measuring device is sensitive to the effects of bending and/or lateral forces.

It is further known from U.S. Pat. No. 3,706,349 to utilize a deforming body in a force measuring device. A central member and an outer ring of this deforming body extend symmetrically and axially in both directions from a radial plane comprising the deforming-measuring member. The deforming-measuring member does not, however, comprise individual radial stems, rather, it comprises a closed ring membrane. Therefore, the characteristic of this prior art force measuring device is not linear, especially because the lines of force running from the inside to the outside can be picked up only at certain points by foils train gages. Accordingly, relatively larger errors can result when bending moments and/or lateral forces occur simultaneously.

OBJECTS OF THE INVENTION

In view of the above it is the aim of the invention to achieve the following objects singly or in combination:

to produce a force measuring device, of the kind mentioned above, which is substantially insensitive to the effects of bending moments, side load and torque moments and which has essentially linear characteristics;

to minimize the deformation of the outer ring;

to construct the load cell so as to have a system of triple bending beams; and to provide an effective parallel guide between the inner central body and the outer ring.

SUMMARY OF THE INVENTION

These objects are realized according to the invention in that the central member and the outer ring of the deforming body are symmetrical to the radial plane of the radial stems and extend axially in both directions to project at least three times the largest axial thickness of the radial stems or lands.

The deformation of the outer ring remains slight when the forces are introduced from this outer ring into the radial stems, because thick ring sections are provided in both axial directions where the radial stems are secured to the middle section of the outer ring. These ring sections stiffen the middle section of the outer ring to counteract deformation.

The radial stems are constructed symmetrically to a radial plane, more specifically these stems are symmetrically profilated on both end faces. Therefore, a substantially linear characteristic of the force measuring device reults even when a bending moment or a side load is applied.

According to the invention, it is intended that the central member and the outer ring are both connected, preferably bolted or screwed, at their two ends to a common support ring. This support ring is provided with radial supporting stems extending in a plane parallel to the radial plane of the radial stems of the deforming body. These radial supporting stems connect an outer ring member to an inner ring member of the supporting ring. The supporting rings with their supporting stems are arranged symmetrically to the radial stems that have foil strain gages attached to them, whereby the supporting rings form a system of triple bending transverse beams all of which are located at the same diameter. A force measuring device assembled as just described is very sensitive to axial forces and is very insensitive to bending moments, shearing stress, torsional forces, and eccentric forces because an effective parallel guiding between the central body member and the outer ring results.

The measurement displacement is very small with a relatively small total structural height of the force measuring device because the radial stems are short and profilated on both sides, so that an almost displacement-free measurement is made possible.

The production of the force measuring device according to the invention does not present any manufacturing technical difficulties, because only the ring-shaped bores on both faces as well as several bore holes separating the individual radial stems from each other, are necessary for producing the deforming body. The radial stems are easily accessible for the attachment of the foil strain gages, in spite of their arrangement in the middle of the deforming body.

The attachment of the two support rings by screws or bolts does not present any difficulties because the facing ends of the central body member and of the outer ring remain substantially free of deformation when forces are introduced into the deforming body.

It is especially advantageous if the outer ring is provided with a force introducing flange on its outside lying in the radial plane of the radial stems. This flange introduces the force into the outer ring. This feature assures that bending moments or a side load have the smallest possible effect on the radial stems carrying the foil strain gages.

The force introducing flange of the outer ring can be provided with fastening bore holes, in parallel with the axis, to attach the force measuring device to the traverse, for example, of a testing machine. Even if varying stresses due to the screws or uneven surfaces arise in the bearing area because of this attachment, the resulting effect that would tend to cause errors are kept away from the radial stems by the outer ring.

BRIEF FIGURE DESCRIPTION

Figure 2:
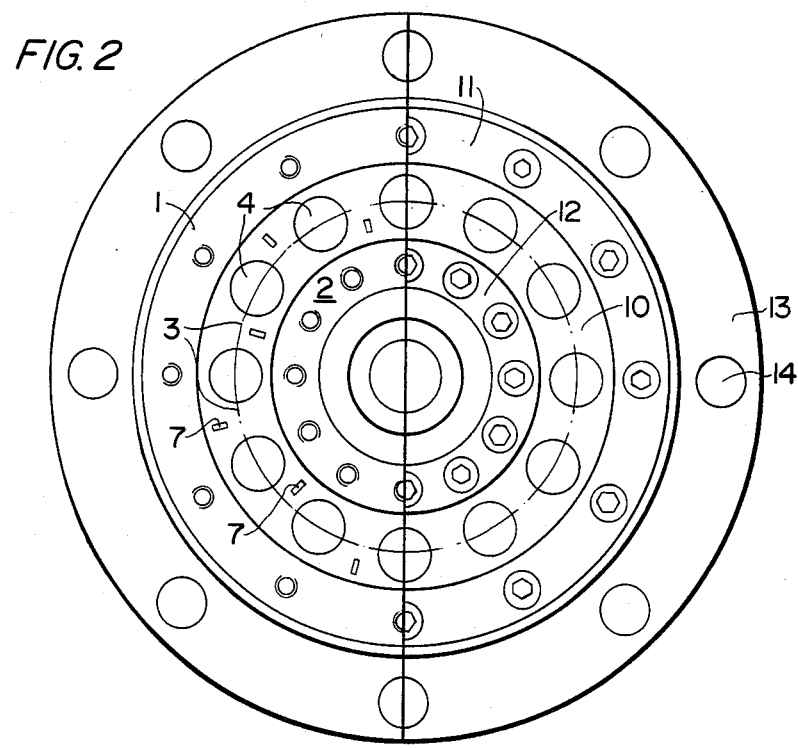

In order that the invention may be clearly understood, it will now be described, by way of example, with reference to the accompanying drawings, wherein:

FIG. 1 shows a force measuring device according to the invention, half of which is shown as a longitudinal section and the other half of which is shown as a side view; and FIG. 2 is a top view onto the force measuring device of FIG. 1, whereby the left half of the upper support ring is left out.

DETAILED DESCRIPTION OF PREFERRED EXAMPLE EMBODIMENTS AND OF THE BEST MODE OF THE INVENTION

The radially symmetric deforming body of the present force measuring device or load cell is constructed as one piece. This one piece or integral deforming body is provided with a substantially hollow cylindrical outer ring 1 and with a likewise substantially hollow cylindrical central hub or member 2. The ring 1 and hub 2 are connected to each other by an annulus of radial stems 3 which are separated from each other by bore holes 4. In the illustrated example embodiment, twelve radial stems 3 are distributed uniformly along the circumference.

The outer ring 1 and the central hub 2 extend symmetrically and axially in both directions from a central radial plane 5 in which the radial stems 3 lie. The axial length of the ring 1 and hub 2 is at least three times the largest axial thickness of the radial stems 3, preferably in each axial direction above and below the plane 5.

To avoid stress peaks when force is introduced into the radial stems 3, the transition zones from the radil stems 3 into the outer ring 1 and into the central hub 2 are provided with rounded grooves 6. Foil strain gages 7 are located in zones of equal deformation on both sides of the radial stems 3. The axially narrowest or shortest part of the radial stems 3 lies approximately radially intermediate the ends of the radial stems 3.

The outer ring 1 and the central hub 2 are interconnected at both of their ends by a respective common support ring 8 that is fastened with screws or bolts 9 to the outer ring 1 and to the central hub 2. Radial support stems or spokes 10 lie in the planes of the support rings 8 parallel to the radial plane 5. These radial support stems 10 connect an outer fastening ring 11 and an inner fastening ring 12 that accept the screws 9. In the illustrated example embodiment, the support stems 10 are constructed in the same size and arrangement as the radial stems 3. The outside of the outer ring 1 is integrally connected to a force introducing flange 13 located in the radial plane 5 and provided with a circle of axially parallel fastening bore holes 14. The force measuring device can, for example, be fastened to a traverse (not shown) of a testing machine by these bore holes to introduce force into the load cell.

The introduction of force into the central hub 2 occurs either through one or both facing ends of the central hub 2. In either case, it occurs through a ring-shaped, crowned force introducing surface 15. Alternately, a force may be applied to a flange 17 extending into the inner bore 16 inside of the hollow cylindrical central hub 2 at the plane 5. This flange 17 is also integrally constructed with the central hub 2 and its two faces are provided with ring-shaped, crowned force introducing surfaces 18.

Instead of making the central hub 2 hollow, it may be constructed as a solid cylinder, the axially facing ends of which are formed as crowned force introducing surfaces. Another example embodiment provides that the hollow cylindrical central hub 2 carries a force introducing threading in its central bore 16.

Although the invention has been described with reference to specific example embodiments, it will be appreciated that it is intended to cover all modifications and equivalents, within the scope of the appended claims.

What is claimed is:

1. A load cell having a central plane and a main axis extending perpendicularly to said central plane to provide a substantially linear characteristic relative to loads applied to the load cell perpendicularly to said central plane and being substantially non-sensitive to any other loads, comprising an integral deforming body including a central hub member, an outer ring, and a number of radially extending stems for carrying strain gage elements, said stems integrally interconnecting said hub and ring to form said deforming body extending axially in opposite directions and symmetrically away from said central plane so that said central plane forms a plane of symmetry, said radial stems having a given maximum axial thickness in the direction of said main axis, said deforming body having an axial length corresponding at least to three times said maximum axial thickness for providing said substantially linear characteristic, said central hub member comprising concentric ring means with at least one axially outwardly facing crowned surface (15, 18) for concentrically applying a force to be measured by said load cell, to said concentric ring means forming part of said central hub member.

2. The load cell of claim 1, wherein said deforming body has an axial length corresponding to three times said maximum axial thickness in each axial direction away from said central plane so that the total axial length of the deforming body is at least six times said maximum axial thickness of said stems.

3. The load cell of claim 1, wherein said strain gage carrying stems have a taper from each stem end inwardly toward a stem zone of lowest axial width.

4. The load cell of claim 3, wherein said strain gage carrying stems comprise transition zones, one at each stem end, merging into said outer ring and into said hub, said transition zones having rounded grooves for avoiding peak stresses, said zone of lowest axial width of said strain gage carrying stems being located approximately centrally between the ends of the respective stem.

5. The load cell of claim 1, further comprising at least one support ring having a radially inner ring portion, a radially outer ring portion, and radial support stems operatively interconnecting said inner and outer ring portions, said support stems extending in parallel to said central plane, and means rigidly securing said support ring to said outer ring and to said central hub ring substantially at the axial end of said outer ring and central hub, whereby the support stems and the strain gage carrying stems form double bending beams.

6. The load cell of claim 5, comprising two of said support rings, one at each end of the outer ring and central hub, whereby the support stems and the strain gage carrying stems form triple bending beams.

7. The load cell of claim 1, further comprising a flange extending radially outwardly and being secured to said outer ring for introducing a load into the load cell, said flange extending symmetrically to and in said central plane.

8. The load cell of claim 7, wherein said radially outwardly extending flange is an integral, one piece part of said outer ring.

9. The load of claim 7, wherein said flange comprises bores extending in parallel to said main axis.

10. The load cell of claim 1, wherein said central hub member comprises a central through bore forming a tubular hollow hub member, and wherein said concentric ring means comprise a radially inwardly extending flange for introducing a load into the load cell, said radially inwardly extending flange extending symmetrically to and in said central plane.

11. The load cell of claim 10, wherein said radially inwardly extending flange is an integral, one piece part of said hollow hub member.

12. The load cell of claim 10, wherein said radially inwardly extending force introducing flange comprises at least one crowned ring-shaped force introducing surface facing axially.

13. The load cell of claim 10, wherein said radially extending flange comprises two crowned ring-shaped force introducing surfaces (18) facing in opposite axial directions.

14. The load cell of claim 1, wherein said concentric ring means comprise at least one concentric crowned axially outwardly facing ring surface forming an end of said central hub member.

15. The load cell of claim 1, wherein said number of radially extending stems for carrying strain gage elements is eight.

16. The load cell of claim 1, wherein said concentric ring means comprise two concentric rings each having a concentric crowned axially outwardly facing ring surface (15) forming axial ends of said central hub member.

* * * * *

UNITED STATES PATENT AND TRADEMARK OFFICE
CERTIFICATE OF CORRECTION

PATENT NO. : 4,545,262
DATED : October 8, 1985
INVENTOR(S) : Reimar Hellwig

It is certified that error appears in the above—identified patent and that said Letters Patent is hereby corrected as shown below:

Claim 15, (column 6, line 18), after "is" insert --at least--.

Signed and Sealed this

Thirty-first Day of December 1985

[SEAL]

Attest:

DONALD J. QUIGG

Attesting Officer

Commissioner of Patents and Trademarks